United States Patent [19]
Brady

[11] Patent Number: 5,881,905
[45] Date of Patent: Mar. 16, 1999

[54] COOKING VESSEL LID

[76] Inventor: John B. Brady, 19 Pin Oaks Dr., Phoenixville, Pa. 19460

[21] Appl. No.: 912,607

[22] Filed: Aug. 18, 1997

[51] Int. Cl.[6] .................................................... B65D 51/16
[52] U.S. Cl. ................................... 220/573.1; 220/23.86; 220/366.1; 220/367.1; 220/374; 220/912
[58] Field of Search ............................... 220/23.86, 231, 220/366.1, 367.1, 368, 369, 373, 374, 573.1, 573.3, 912

[56] References Cited

U.S. PATENT DOCUMENTS

| | | | |
|---|---|---|---|
| 741,348 | 10/1903 | Lane . | |
| 1,166,475 | 1/1916 | Paquette . | |
| 2,573,719 | 11/1951 | Lebherz | 220/231 |
| 2,702,143 | 2/1955 | Williamson | 220/369 |
| 2,751,901 | 6/1956 | Livermore | 220/369 X |
| 2,760,672 | 8/1956 | Cronheim | 220/369 X |
| 3,457,852 | 7/1969 | Kwoh | 220/23.86 X |
| 4,091,956 | 5/1978 | Vecchio | 220/369 X |
| 4,528,975 | 7/1985 | Wang | 220/573.1 X |
| 4,607,613 | 8/1986 | Toldi | 220/573.1 X |
| 5,012,071 | 4/1991 | Henke | 220/369 X |
| 5,145,089 | 9/1992 | Chang . | |
| 5,386,921 | 2/1995 | Kuhn . | |
| 5,441,707 | 8/1995 | Lewis et al. | 220/23.86 X |
| 5,487,329 | 1/1996 | Fissler . | |
| 5,497,696 | 3/1996 | Coudurier . | |

*Primary Examiner*—Stephen K. Cronin
*Attorney, Agent, or Firm*—LaMorte & Associates

[57] ABSTRACT

A lid for a cooking vessel such as a pot. The lid is circular and has a central region and a peripheral region. At least one aperture is disposed within the central region of the lid, thereby enabling hot air and steam to pass through the lid. A plurality of rib elements are disposed on the top of the lid, wherein the various rib elements define a pathway from the apertures in the central region to the peripheral region. The rib elements all terminate in the same plane. As such, a cooking vessel can be placed on top of the lid and the rib elements will support that cooking vessel in an even manner. As hot air and steam from a cooking vessel rise up, that hot air and steam passes through the apertures in the lid. The hot air and steam then passes through the pathways on the top surface of the lid, thereby allowing that hot air and steam to heat a second cooking vessel placed on the lid.

14 Claims, 4 Drawing Sheets

COOKING VESSEL LID

BACKGROUND OF THE INVENTION

1. Field of the Invention

The present invention relates in general to lids and covers for pots, pans and other cooking vessels. More particularly, the present invention relates lids and covers that have area of perforation that enable steam and/or hot air to exit the cooking vessel in a controlled manner, whereby the exiting steam and/or hot air can be used to heat a second cooking vessel.

2. Description of the Prior Art

In the prior art record, there is a wide variety of different cooking vessels and covers for those cooking vessels. A common traditional cooking vessel is a metal pot or pan having a round open top. The traditional lid for such a pot or pan is a metal lid with a handle in it's center. The lid is sized to exactly cover the round open end of the pot or pan. As a result, different sized pots and pans use different sized lids and the lids between different pots and pans are not normally interchangeable.

Traditional lids for pots, pans and other cooking vessels are solid. As a result, when a lid is placed over a pot or pan, the contents of the pot or pan are sealed. If the pot or pan is placed over heat and the contents begin to boil, the resultant steam has no where to go within the sealed confines of the pot or pan. As a result, the pressure of the steam within the pot or pan causes the lid to periodically raise so that steam can escape. The lid, therefore, chatters on the top of the pot or pan until the lid is removed or heat source is removed. A solid lid also traps heat within the confines of a pot or pan. As a result, the contents of the pot or pan do not cool rapidly. As a result, the contents of a covered pot or pan may continue to boil until the contents boiler over and out onto the stove top. By the time a cook sees or hears the chatter of a lid on a pot or pan, some of the contents may have already spilled out past the lid with the escaping steam. This causes the sides of the pot or pan and the stove top to become dirty and require cleaning.

Another disadvantage of traditional pot lids and pan lids is that the presence of the lid handle in the top center of the lid prevents any other pot or pan from being placed onto that lid. Consequently, pots and pans cannot be doubled up on the stove top and each pot or pan must have its own burner on the stove.

A need, therefore, exists in the art for a single pot or pan lid that is capable of covering numerous different sized pots and pans.

A need also exists for a lid that enables steam to escape from a pot or pan in a controlled manner that enables some of the escaping heat to be reused.

Lastly, a need also exists for a lid that is flat and is capable of supporting other pots and pans, thereby enabling pots and pans to be doubled up on a stove top.

These needs are met by the present invention as described and claimed below.

SUMMARY OF THE INVENTION

The present invention is a lid for a cooking vessel such as a pot or pan. The lid is circular and has a central region and a peripheral region. At least one aperture is disposed within the central region of the lid, thereby enabling hot air and steam to pass through the lid. A plurality of rib elements are disposed on the top of the lid. The various rib elements define a pathway from the apertures in the central region to the peripheral region. The rib elements all terminate in the same plane. As such a cooking vessel can be placed on top of the lid and the rib elements will support that cooking vessel in an even manner. As hot air and steam from a cooking vessel rise up, that hot air and steam pass through the apertures in the lid. The hot air and steam then pass through the pathways on the top surface of the lid, thereby allowing that hot air and steam to heat a second cooking vessel placed on the lid.

The bottom surface of the lid also contains rib elements. The rib elements engage the top of the cooking vessel when the lid is placed over a cooking vessel. The rib elements define gaps through which air can pass under said lid element and into the cooking vessel, thereby creating a flow of air into the cooking vessels that reduces the likelihood that the contents of the cooking vessel will boil over.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
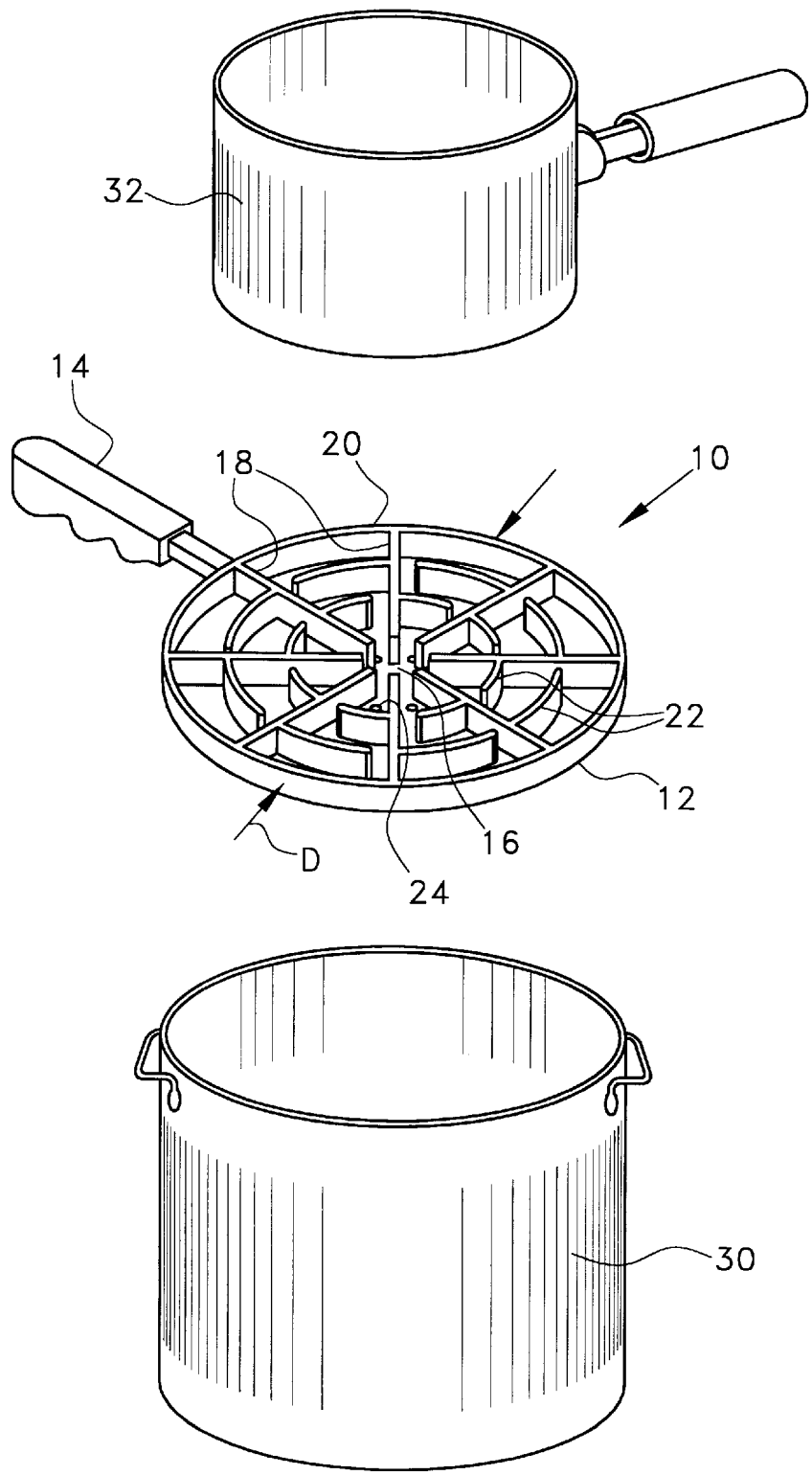
FIG. 1 is a perspective view of one preferred embodiment of the present invention lid shown in conjunction with two different sized pots to illustrate the intended method of use for the present invention.

Referring to FIG. 1, an exemplary embodiment of a lid device 10 is shown in accordance with the present invention. The lid device 10 has a round section 12 that has a preferred diameter D of between six inches and eighteen inches. Such a range of diameters is adequate to cover most common cooking vessels, however, any other diameter can be used. The round section 12 of the lid element 10 is made of metal with a high heat transfer capacity, such as aluminum or aluminum alloy. The round section 12 of the lid device 10 is symmetrically formed. As a result, the round section 12 of the lid device 10 has a center of gravity that acts in the center of the round section 12.

A handle element 14 radially extends from a point on the periphery of the round section 12. The handle element 14 enables the lid device 10 to be safely manipulated when hot. The presence of the handle element would normally change the center of gravity for the overall lid device 10 away from the center of the round section 12. However, as will be later explained, the round section 12 of the lid device 10 includes a counter weight (not shown) that is sized and positioned to counter the weight of the handle element 14. As a result, the center of gravity for the entire lid device 10 remains proximate the center of the round section 12.

Figure 2:
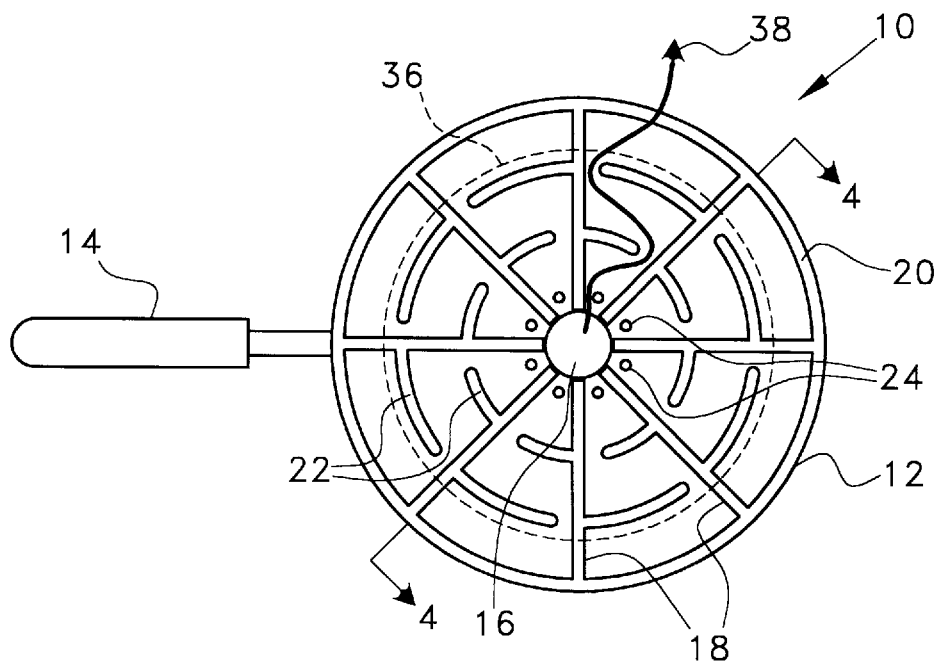
FIG. 2 a top view of the embodiment of the lid shown in FIG. 1.

Referring to FIG. 2 in conjunction with FIG. 1, it can be seen that the top surface of the round section 12 of the lid device 10 is neither solid nor flat. A large aperture 16 extends through the round section 12 of the lid device 10 at its center. The aperture 16 preferably has a diameter of between one inch and three inches, however any sized aperture can be used. Rib elements 18 radially extend from the central aperture 16, wherein each rib element 18 extends from the edge of the central aperture 16 to the peripheral edge 20 of the round section 12 of the lid element 10. The rib elements 18 share the same height as does the peripheral edge of the round section 12 of the lid device 10. As a result, the rib elements 18 and the peripheral edge 20 terminate in a common plane. The presence of the rib elements 18 divide the top surface of the round section 12 of the lid device 10 into equal sections. Contained within each of the sections are a plurality of baffle elements 22. Although only two baffle elements 22 are shown in each section, it should be understood that no baffle elements or any plurality of baffle elements can be used. The baffle elements 22 have the same height as does the rib elements 18 and the peripheral edge 20, thereby terminating in the same plane as these elements. The purpose of the baffle elements 22 is to create a convoluted path in between the central aperture 16 and the peripheral edge 20 of the round section 12 of the lid device 10.

Smaller apertures 24 may also be located in each of the different sections proximate the larger central aperture 16.

Returning to FIG. 1, it can be seen that the lid device 10 can be placed over a pot 30 or other cooking vessel that has a smaller diameter than that of the round section 12 of the lid device 10. Since the handle element 14 is balanced by a counter weight, the lid device 10 remains stable on top of the pot 30 when placed over the pot 30. A second pot 32 can also be placed on top of the round section 12 of the lid device 10. The rib elements 18, baffle elements 22 and peripheral edge 20 of the round section 12 of the lid device 10 terminate in a common horizontal plane. As such, a flat surface is provided that is capable of supporting the second pot 32.

As the contents of the bottom pot 30 heat on a stove, hot air and steam begin to rise out through the central aperture 16 in the middle of the round section 12 of the lid device 10 and the smaller apertures 24 that surround the central aperture 16. The rising hot air and steam can then be used to heat the contents of the second upper pot 32. Referring to FIG. 2 the area cover by the base 36 of the second upper pot is shown by a circle made with a broken line. From arrow 38 in FIG. 2, it can be seen that as hot air and steam rise through the apertures in the round section 12 of the lid device 10, the hot air and steam travel along a convoluted path below the base 36 of the second pot. The convoluted path is created by the positioning of the various rib elements 18 and the baffle elements 22 that extend from the rib elements 18.

Since the passing hot air and steam is travelling along convoluted paths, that hot air and steam are exposed to a large area on the base 36 of the second pot. Consequently, a high efficient heat transfer occurs between the passing heat and the second pot. The contents of the second pot therefore are warmed accordingly.

Figure 3:
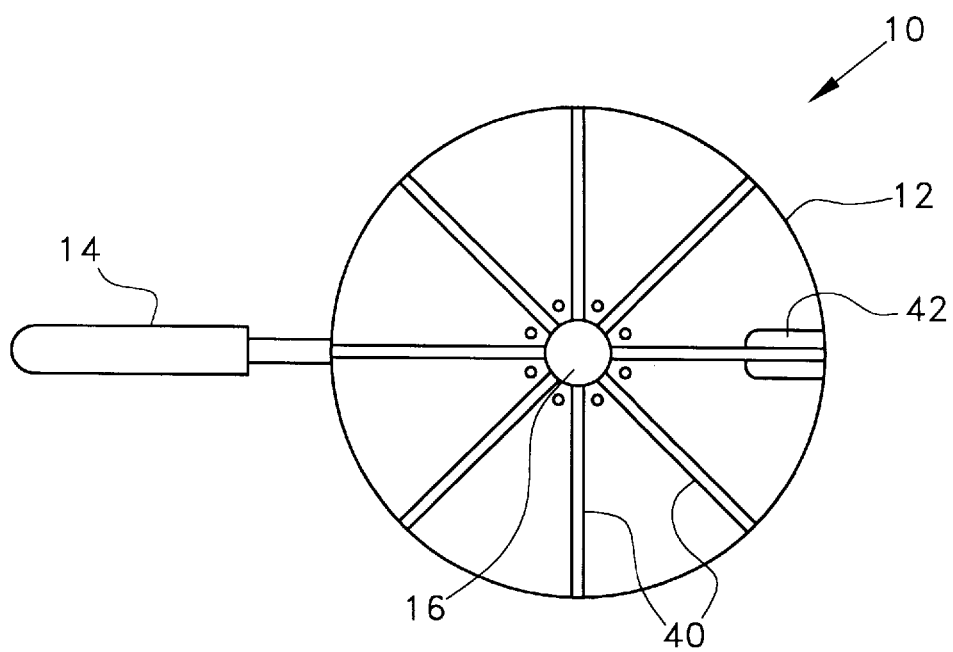
FIG. 3 is a bottom view of the embodiment of the lid shown in FIG. 1.

Referring to FIG. 3, an exemplary embodiment of the bottom surface of the round section 12 of the lid device 10 is shown. The bottom surface of the round section 12 of the lid device 10 also includes a plurality of rib elements 40 that radially extend from the central aperture 16. From FIG. 3, the counter weight 42 that counter balances the handle element 14 is also shown as an area of increased rib size directly opposite the handle element 14.

Figure 4:
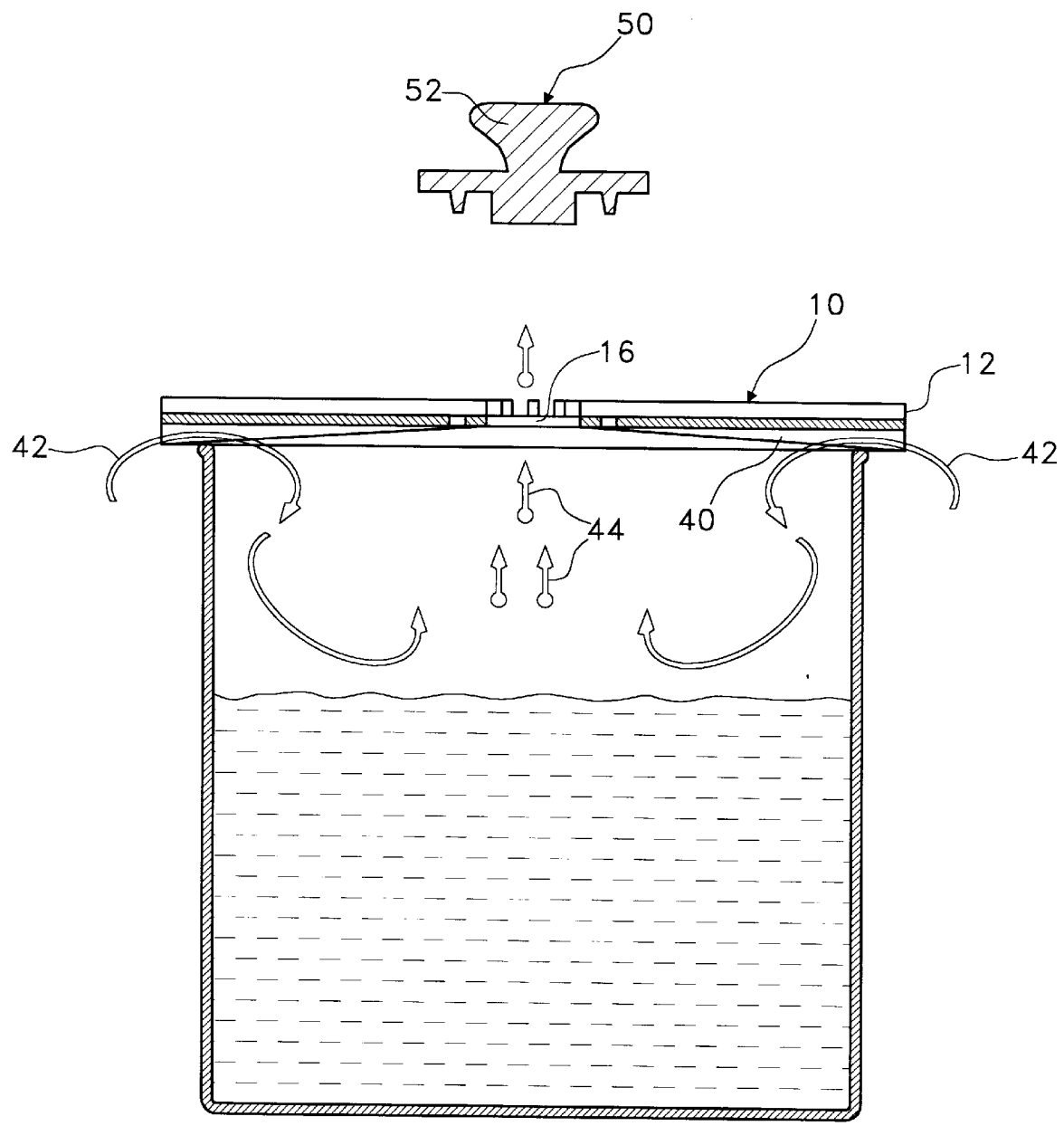
FIG. 4 is a cross-sectional view of the embodiment of the lid shown in FIG. 2 viewed along section line 4—4, shown in conjunction with an optional pug cap.

Referring to FIG. 4, it can be seen that the various rib elements 40 on the bottom surface of the round section 12 of the lid device 10 are tapered. As a result, the round section 12 of the lid device is thinnest near the central aperture 16. When the bottom surface of the lid device is placed on a pot, the central aperture 16 is at an elevated position relative the remainder of the lid device structure. As a result, hot air and steam are naturally directed to the central aperture 16 as that hot air and steam rises.

The round section 12 of the lid device 10 does not create an air impervious seal with the pot that it covers. Rather, due to the various rib elements 40 on the bottom surface of the lid device 10, air is allowed to pass into the pot below the lid device 10, as is indicated by arrows 42. As shown by arrows 44, as hot air and steam rise out of the pot through the lid device 10, fresh air is drawn into the pot. The flow of fresh air into the pot significantly reduces the likelihood that the contents of the pot will boil over out of the pot when overheated. Rather, the flow of fresh air maintains the contents of the pot near its boiling point and at a controlled simmer.

In FIG. 4 and optional plug cap 50 is shown. In certain situations, a cook may not want excess heat to escape from a pot. As such, a plug cap 50 that fit onto the lid device 10 is provided. The plug cap 50 is shaped to plug the central aperture 16 and the smaller apertures 24 (FIG. 2) in the lid device 10. The plug cap 50 also comes with a handle 52 so that the plug cap 50 can be easily maneuvered when hot. When the plug cap 50 is in place, hot air and steam are no longer permitted to pass through the center of the lid device 10. The lid device 10 therefore functions much in the same manner as a traditional solid lid. When the plug cap 50 is removed, the hot air and steam can pass through the lid device 10 and the lid device 10 returns to the function previously described.

Figure 5:
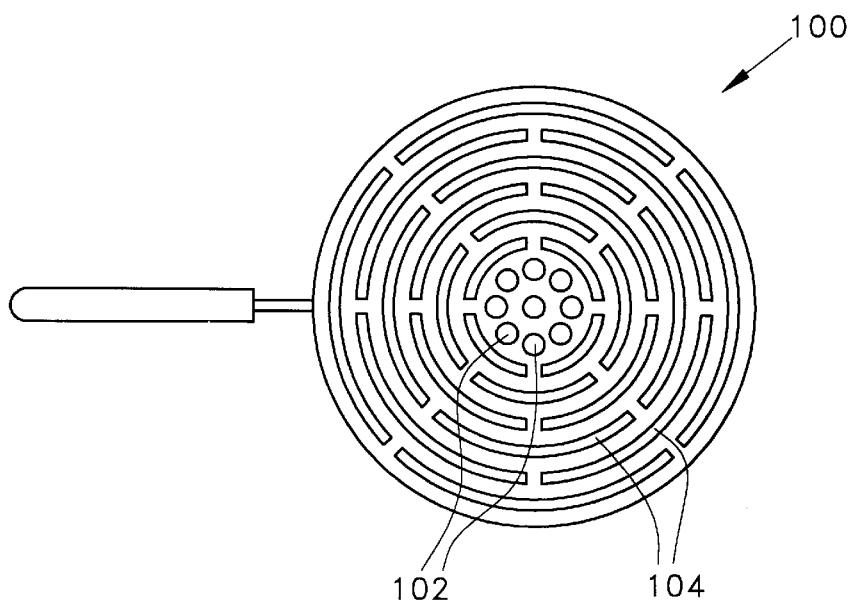
FIG. 5 is a top view of an alternate embodiment of the present invention lid.

Referring to FIG. 5, an alternate embodiment of a lid device 100 is shown. The purpose of this alternate embodiment is to illustrate that the apertures and the ribbing on the lid device can have many different configurations in accordance to the present invention. In the shown embodiment, no one large central aperture is used. Rather, the center of the lid device 100 is perforated with a plurality of smaller apertures 102. Hot air and steam will rise through the plurality of apertures 102 in the same manner that the hot air and steam rose through the single large aperture in the previous embodiment.

Also shown in FIG. 5 is a different pattern of baffle ribs 104. The baffle ribs 104 create a convoluted pathway for the passing hot air and steam that is more complex that previously described, thereby enabling more heat transfer to occur between the rising heat and a pot placed on top of the lid device 100.

Figure 6:
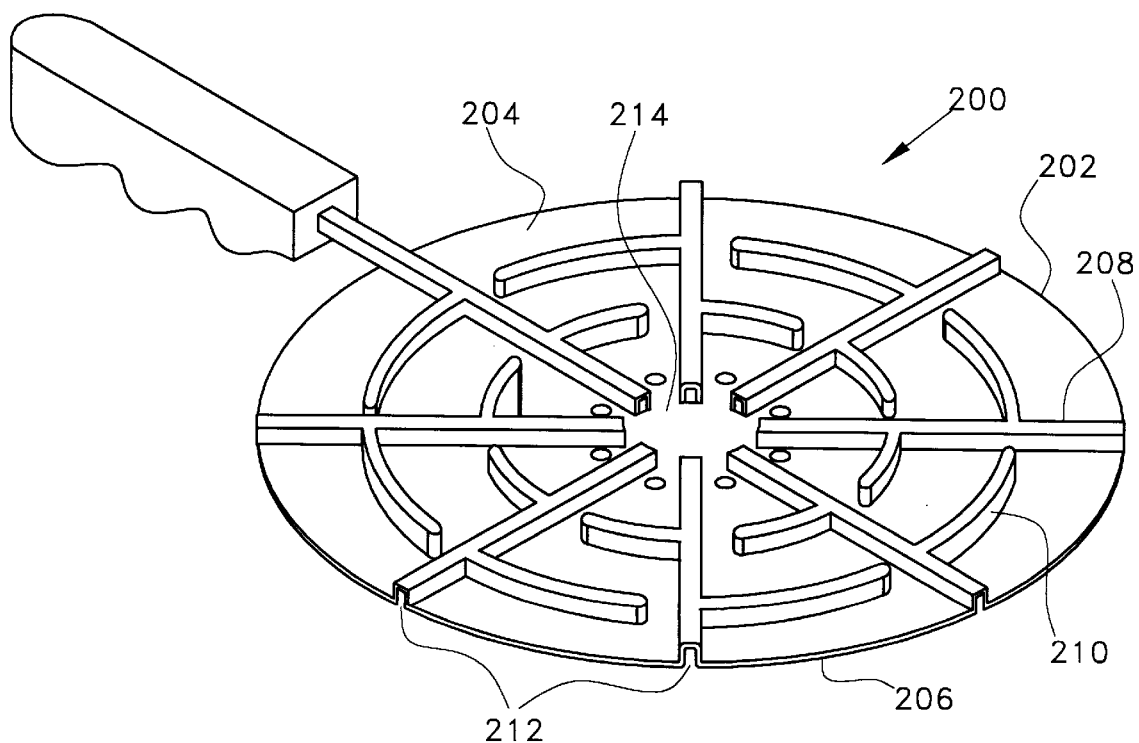
FIG. 6 is a perspective view of a second alternate embodiment of the present invention lid having a stamped manufacture.

Referring to FIG. 6, a second alternate embodiment of a lid device 200 is shown. In this embodiment, the lid device 200 is produced by stamping a flat blank of metal 202. As such, it should be understood that for every point on the top surface 204 of the lid device 200 that protrudes upwardly, there is a corresponding depression on the bottom surface 206 of the lid device 200. As a result, for each of the rib elements 208 and baffle elements 210 that are present on the top surface 204 of the lid device 200, a depression of the same shape is disposed on the bottom surface 208 of the lid device 200.

Since the lid device 200 is stamped, the ends 212 of the rib elements 208 are open. The rib elements 208 therefore create conduits that permit air to flow under the lid element 200 and into a pot when hot air and steam from that pot are rising through the aperture 214 in the center of the lid element 200. As has been previously described in conjunction with FIG. 4, the flow of fresh air under the lid element 200 maintains the contents of the pot near its boiling point and at a controlled simmer.

It will be understood that the embodiments of the present invention lid device, illustrated and described above, are merely exemplary and many variations and modifications can be made by using functionally equivalent components and/or alternate embodiments. All such variations and modifications are intended to be included within the scope of the invention as defined by the appended claims.

What is claimed is:

1. A device, comprising:
   circular lid element having a top surface, a bottom surface, a central region and a peripheral region;
   at least one open aperture defined by said lid element solely within said central region, wherein said at least one open aperture extends through said lid element from said top surface to said bottom surface, thereby enabling hot air to pass through only said central region of said circular lid;
   a plurality of rib elements disposed on said top surface of said lid element, wherein said rib elements radially extend from said central region to said peripheral region and define pathways for the flow of hot air that extend from said central region to said peripheral region.

2. The device according to claim 1, wherein said plurality of rib elements terminated in a common plane.

3. The device according to claim 1, further including baffle elements that extend from said rib elements and cause said pathways to travel in a non-linear manner from said central region to said peripheral region.

4. The device according to claim 1, wherein said at least one aperture is a single aperture disposed in the center of said lid element having a diameter of between one inch and three inches.

5. The device according to claim 1, further including a handle element extending from said peripheral region of said lid element.

6. The device according to claim 5, wherein said lid element has a center of gravity at a predetermined point in said central region and said lid element contains a counter weight that compensates for said handle element and maintains a center of gravity for said device generally at said predetermined point.

7. The device according to claim 1, wherein said central region on said bottom side of said lid device is elevated relative said peripheral region on said bottom side of said lid element.

8. The device according to claim 1, further including a second plurality of rib elements on said bottom side of said lid element.

9. The device according to claim 8, wherein said second plurality of rib elements radially extend from said central region to said peripheral region.

10. The device according to claim 9, wherein said second plurality of rib elements taper from a first thickness in said peripheral region to a second shorter thickness in said central region.

11. A device for covering a cooking vessel, comprising:
    lid element having a top surface, a bottom surface, a central region and a peripheral region;
    a plurality of rib elements disposed on said bottom surface of said lid element that engage the cooking vessel, wherein said rib elements radially extend from said central region to said peripheral region and define gaps through which air can pass under said lid element and into the cooking vessel.

12. The device according to claim 11, further including at least one aperture defined by said lid element within said central region, wherein said aperture extends through said lid element from said top surface to said bottom surface and said at least one aperture communicates with gaps between said rib elements.

13. The device according to claim 11, wherein said plurality of rib elements taper from a first thickness in said peripheral region to a second shorter thickness in said central region.

14. A device, comprising:
    a circular lid element having a top surface, a bottom surface, a central region and a peripheral region;
    an aperture having a diameter between one inch and three inches defined by said lid element within said central region, wherein said aperture extends through said lid element from said top surface to said bottom surface;
    a plurality of rib elements disposed on said top surface of said lid element, wherein said rib elements define pathways that extend from said central region to said peripheral region.

* * * * *